Nov. 29, 1927.  
J. R. ROGERS  
1,651,154  
TYPOGRAPHICAL COMPOSING AND DISTRIBUTING MACHINE  
Filed March 19, 1926   10 Sheets-Sheet 1

INVENTOR  
John R. Rogers  
BY  
Rogers, Kennedy & Campbell  
ATTORNEYS

Nov. 29, 1927.  
J. R. ROGERS  
1,651,154  
TYPOGRAPHICAL COMPOSING AND DISTRIBUTING MACHINE  
Filed March 19, 1926  10 Sheets-Sheet 4

INVENTOR  
John R. Rogers  
BY  
ATTORNEYS

Nov. 29, 1927.  1,651,154
J. R. ROGERS
TYPOGRAPHICAL COMPOSING AND DISTRIBUTING MACHINE
Filed March 19, 1926   10 Sheets-Sheet 5
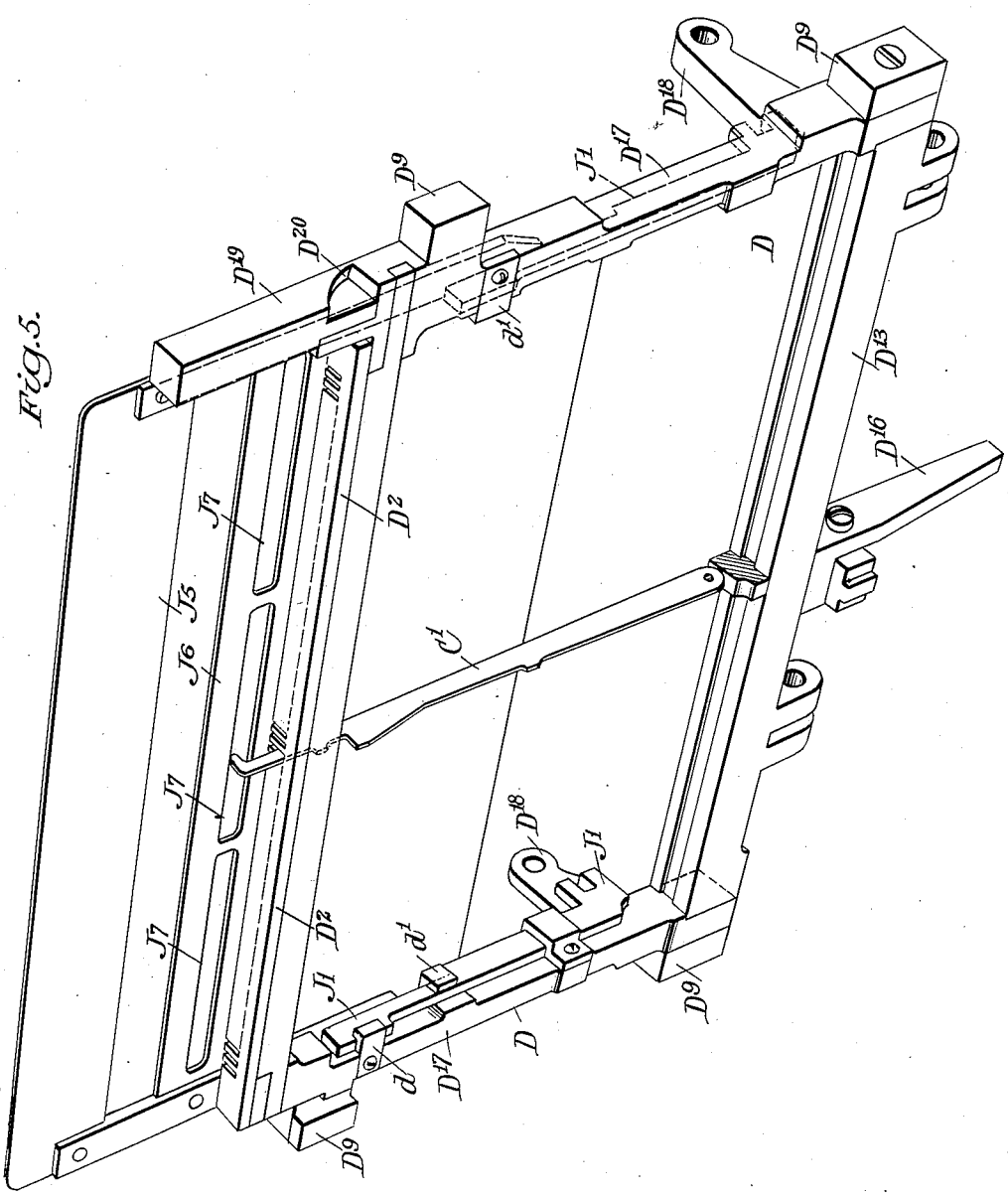
INVENTOR
John R. Rogers
BY
Rogers, Kennedy & Campbell
ATTORNEYS Nov. 29, 1927. 1,651,154
J. R. ROGERS
TYPOGRAPHICAL COMPOSING AND DISTRIBUTING MACHINE
Filed March 19, 1926  10 Sheets-Sheet 6
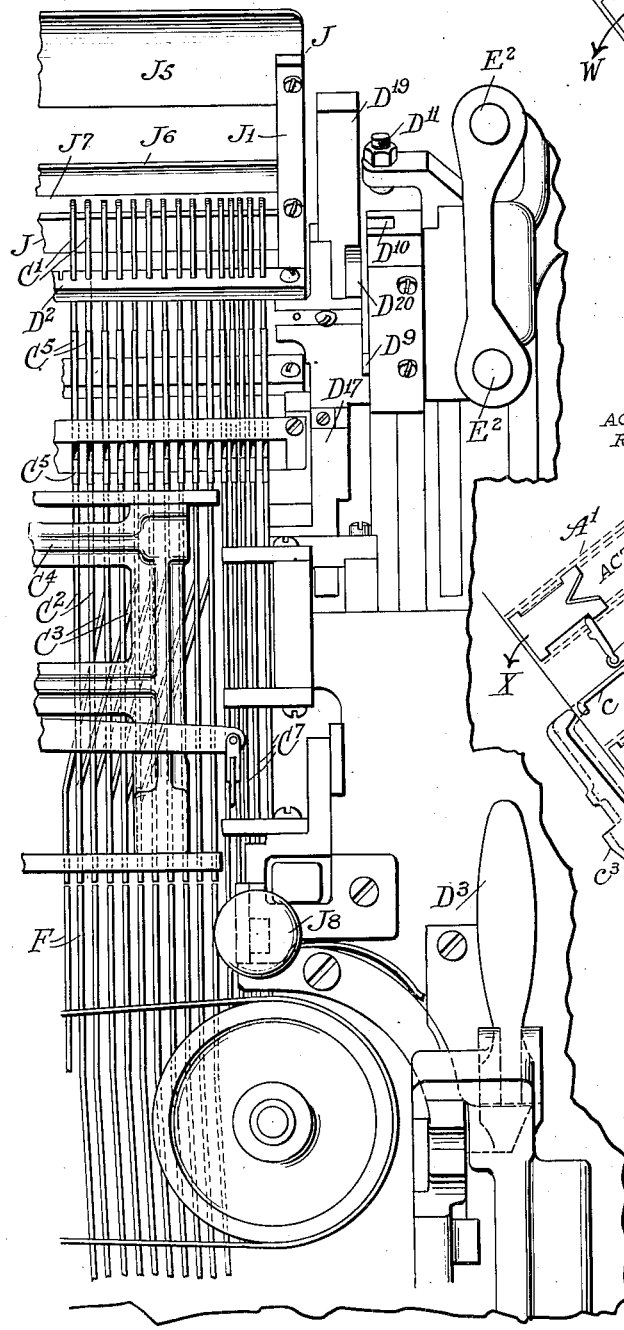
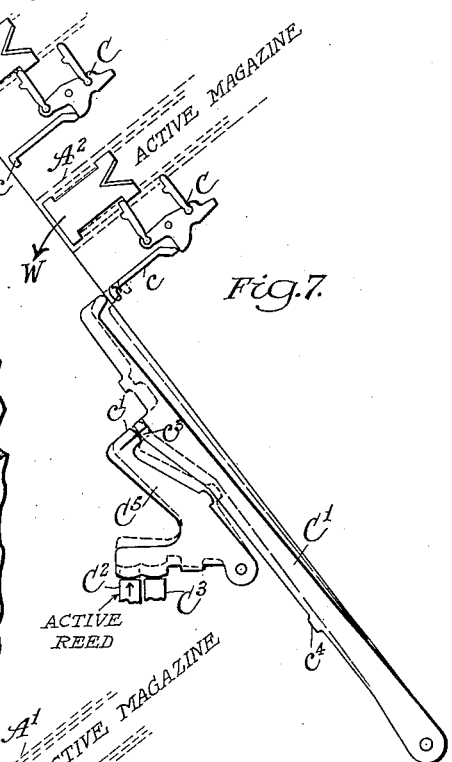
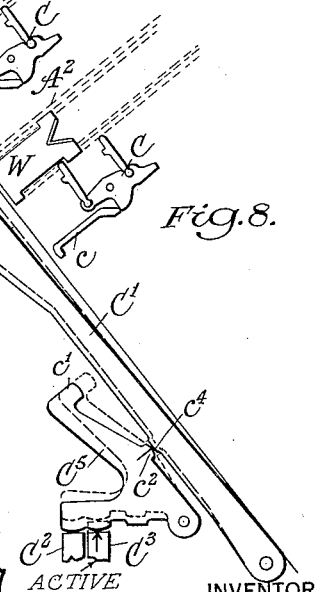
INVENTOR
John R. Rogers
BY
Rogers, Kennedy & Campbell
ATTORNEYS Nov. 29, 1927. 1,651,154
J. R. ROGERS
TYPOGRAPHICAL COMPOSING AND DISTRIBUTING MACHINE
Filed March 19, 1926 10 Sheets-Sheet 7

INVENTOR
John R. Rogers
BY
Rogers Kennedy Campbell
ATTORNEYS

Nov. 29, 1927. 1,651,154
J. R. ROGERS
TYPOGRAPHICAL COMPOSING AND DISTRIBUTING MACHINE
Filed March 19, 1926   10 Sheets-Sheet 8

INVENTOR
John R. Rogers
BY
Rogers, Kennedy & Campbell
ATTYS

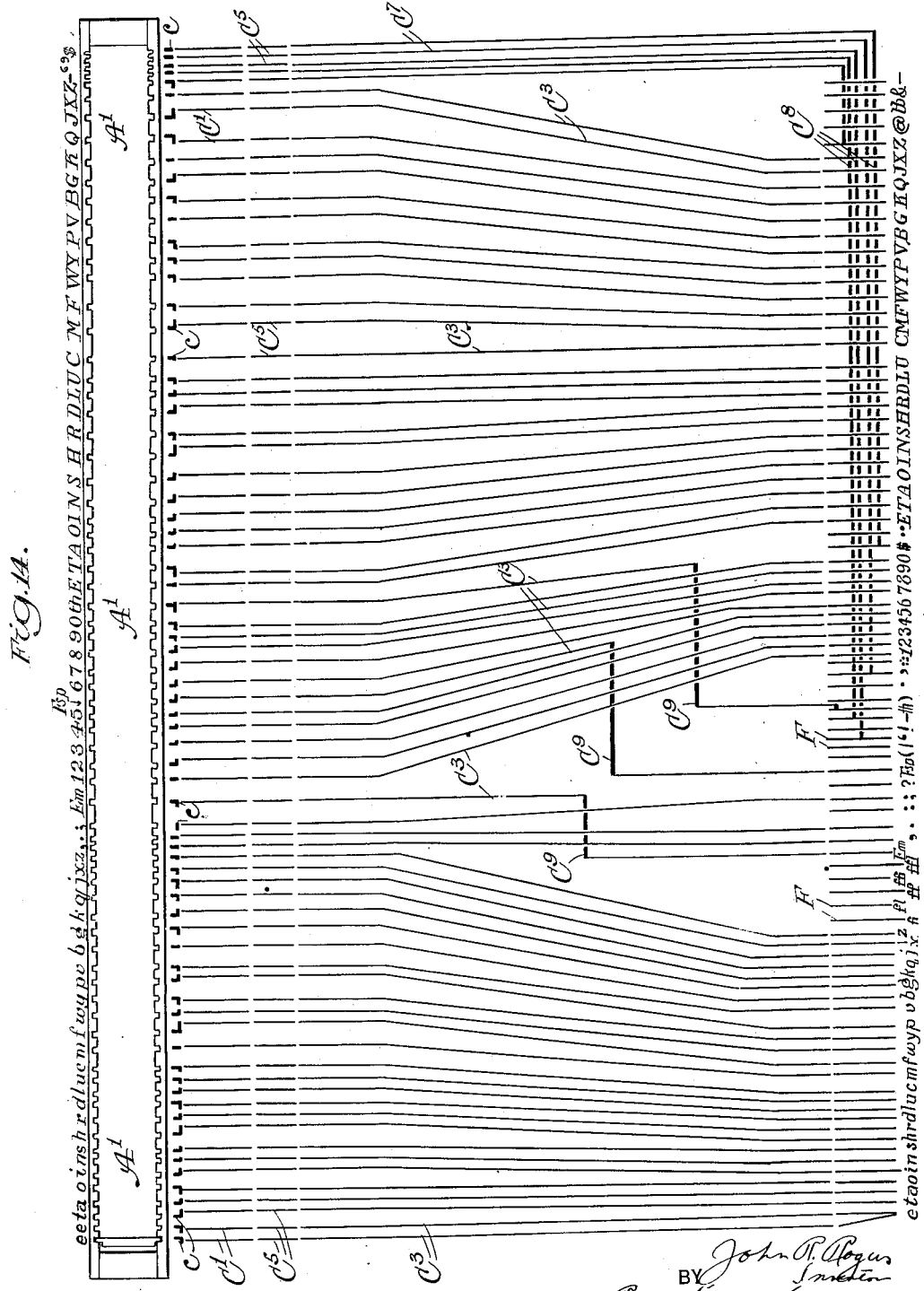

Nov. 29, 1927.
J. R. ROGERS
1,651,154
TYPOGRAPHICAL COMPOSING AND DISTRIBUTING MACHINE
Filed March 19, 1926    10 Sheets-Sheet 10
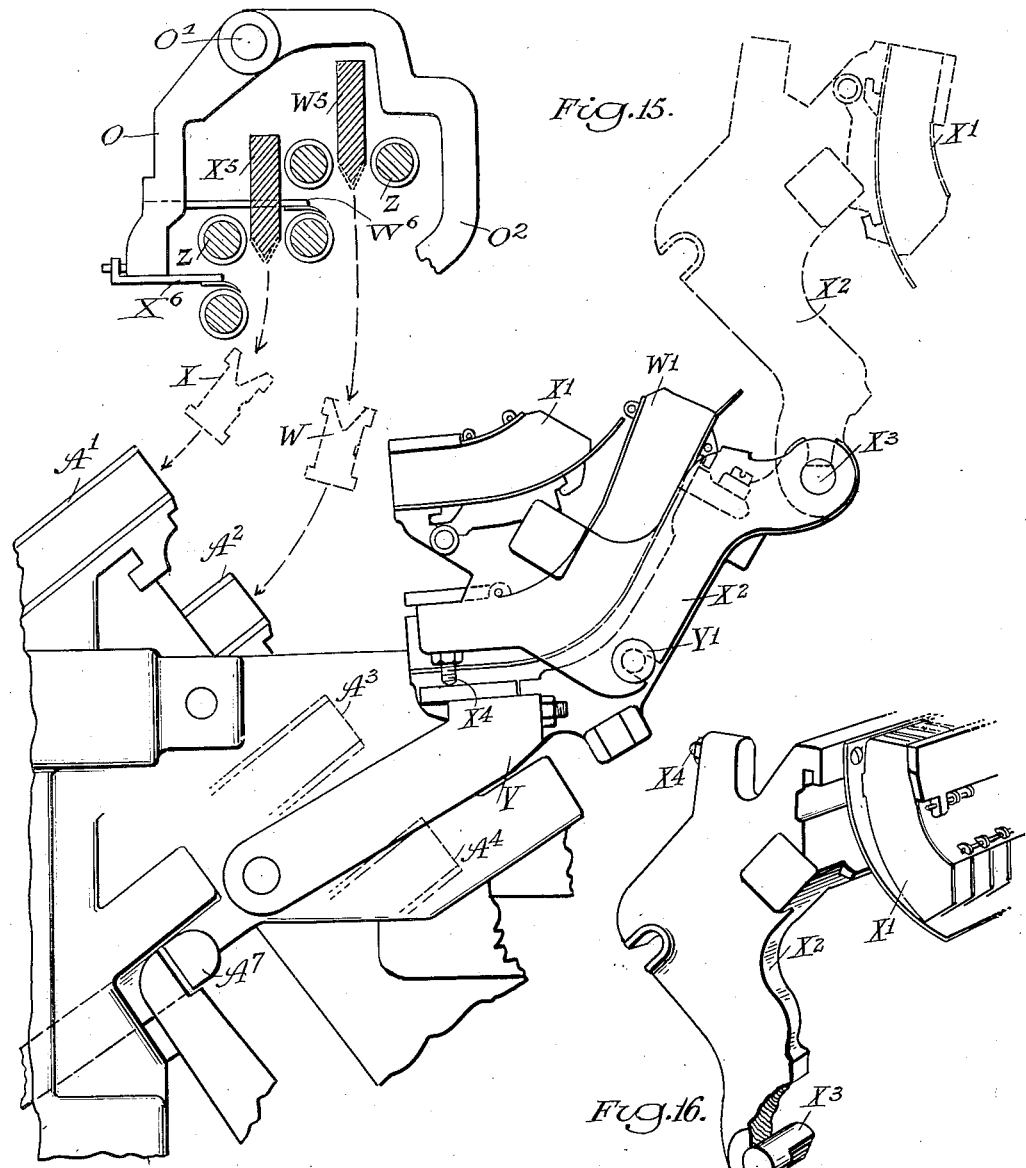
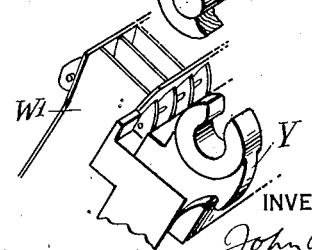
INVENTOR
John R. Rogers
BY
Rogers, Kennedy Campbell
ATTORNEYS Patented Nov. 29, 1927.

1,651,154

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

TYPOGRAPHICAL COMPOSING AND DISTRIBUTING MACHINE.

Application filed March 19, 1926. Serial No. 95,878.

This invention relates to typographical composing and distributing machines, such as linotype machines of the general organization represented by Letters Patent of the United States to O. Mergenthaler, No. 436,532, wherein circulating matrices are released from a magazine in the order in which their characters are to appear in print and then assembled in line, the composed line transferred to the face of a slotted mold, the mold filled with molten metal to form a slug or linotype against the matrices which produce the type characters thereon, and the matrices thereafter returned through distributing mechanism to the magazine from which they started.

There are now in use two distinct machines, one designed for the use of ordinary matrix fonts comprising ninety different characters suitable for the more usual composition or "straight" matter, and the other designed for special matrix fonts comprising only seventy-two characters suitable for head letter and display work, etc. It is the general object of the present invention to provide a single machine capable of handling any of the ordinary matrix fonts or any of the special matrix fonts, or both together, so that such machine may be used for any class of work desired. The various improvements by which this result is accomplished will best be understood from the detailed description to follow.

In the accompanying drawings the improvements are shown in connection with a four-magazine machine wherein the magazines are mounted in superimposed relation in a shift frame which is movable upwardly and downwardly to locate the upper or lower pair in operative position. However, it should be understood that they are equally applicable to machines of other kinds, including those equipped with a single pair of magazines. In short, the invention is shown merely in preferred form by way of example, and obviously many changes and modifications may be made therein without departing from its spirit. It is, therefore, to be understood that the invention is not limited to any specific form or embodiment except in so far as such limitations are specified in the claims.

Referring to the drawings:

Fig. 5 is a perspective view of said supporting frame detached, and showing the mounting of the detector;

Fig. 6 is a fragmentary front elevation of the parts shown in Fig. 2 with the assembler throats and raceway removed;

Figs. 7 and 8 are diagrammatic views showing the operation of the escapement actuating devices in different adjusted positions;

Fig. 14 is a diagram showing the connections between the escapements of a seventy-two character magazine and the corresponding key rods;

Fig. 15 is a side elevation, partly in section, of the upper portion of the machine, showing the magazine entrances swung backwardly to inoperative position; and Fig. 16 is a detailed perspective showing the manner of mounting the upper magazine entrance to permit ready removal.

Figure 1:
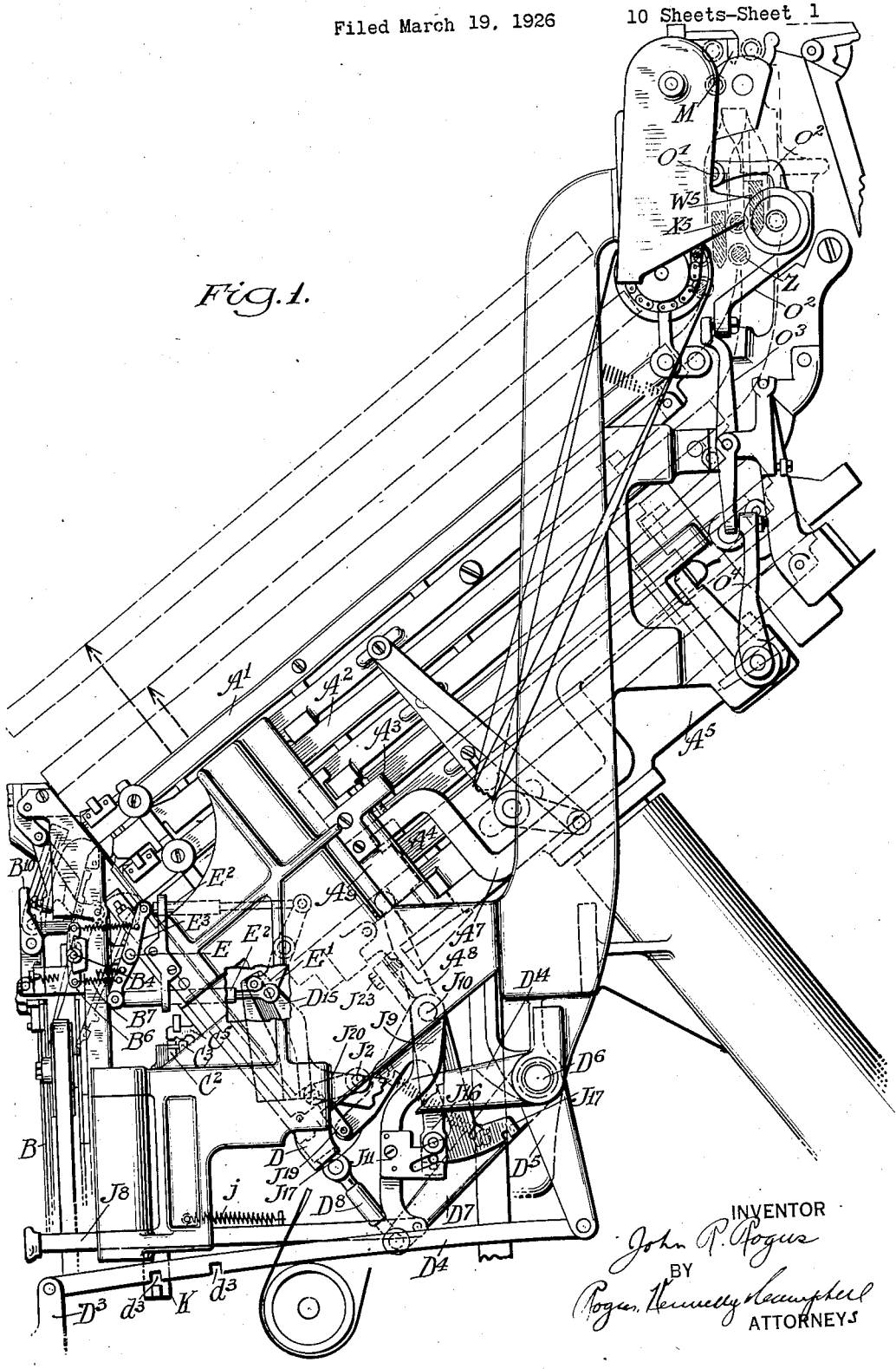
Fig. 1 is a side elevation of the upper portion of a linotype machine equipped with the present improvements.

In the embodiment illustrated, the machine is equipped with four magazines, $A^1$, $A^2$, $A^3$, $A^4$. The second and fourth magazines $A^2$ and $A^4$, of the regular or standard form, are each provided with ninety-one grooved channels spaced apart in the usual way to adapt them to contain the ordinary ninety character matrix fonts W, whereas the first and third magazines $A^1$ and $A^3$, although of the same width as the other magazines, are provided with only seventy-three grooved channels spaced apart in a different manner to adapt them to contain the seventy-two character display fonts X. The several magazines are carried in a shift frame $A^5$, which is arranged to be raised and lowered in the well-known manner to bring either the upper two or the lower two magazines into operative position. While there is thus provided two distinct pairs of magazines alternately usable, the invention is equally applicable to a single pair and will be so described hereinafter, reference being had to the upper pair of magazines $A^1$, $A^2$, which are shown in operative position in the drawings.

In order to cooperate simultaneously with both of the operative magazines, the channeled raceway of front-plate B is provided with two channeled throats $B^1$ and $B^2$, the latter having its partition plates arranged to correspond with the matrix columns or channels of the inner magazine $A^2$, and the former having its partition plates differently arranged to correspond with the matrix columns or channels of the outer magazine $A^1$. Each of the magazines is provided with a series of matrix releasing escapement C adapted to be actuated by a series of key-controlled levers or members $C^1$. These actuating levers $C^1$ are carried by a supporting frame D, which is slidably mounted in the framework for adjustment upwardly and downwardly to locate the levers in engaging relation to the escapements of either of said magazines as desired; said levers being pivoted at their lower ends upon a transverse rod $D^1$ and spaced apart near their upper ends by a comb plate $D^2$, whose slots are open at the rear to permit the levers to be rocked rearwardly in actuating the escapements. It will be noted that normally the actuating levers $C^1$ lie beyond the escapements or lower ends of the magazines so as to clear these parts during their adjustment, and also that when they are located in operative relation to either magazine, they stand below and out of the path of the released matrices, thus imposing no restriction upon the size or thickness of the matrices.

Figure 4:
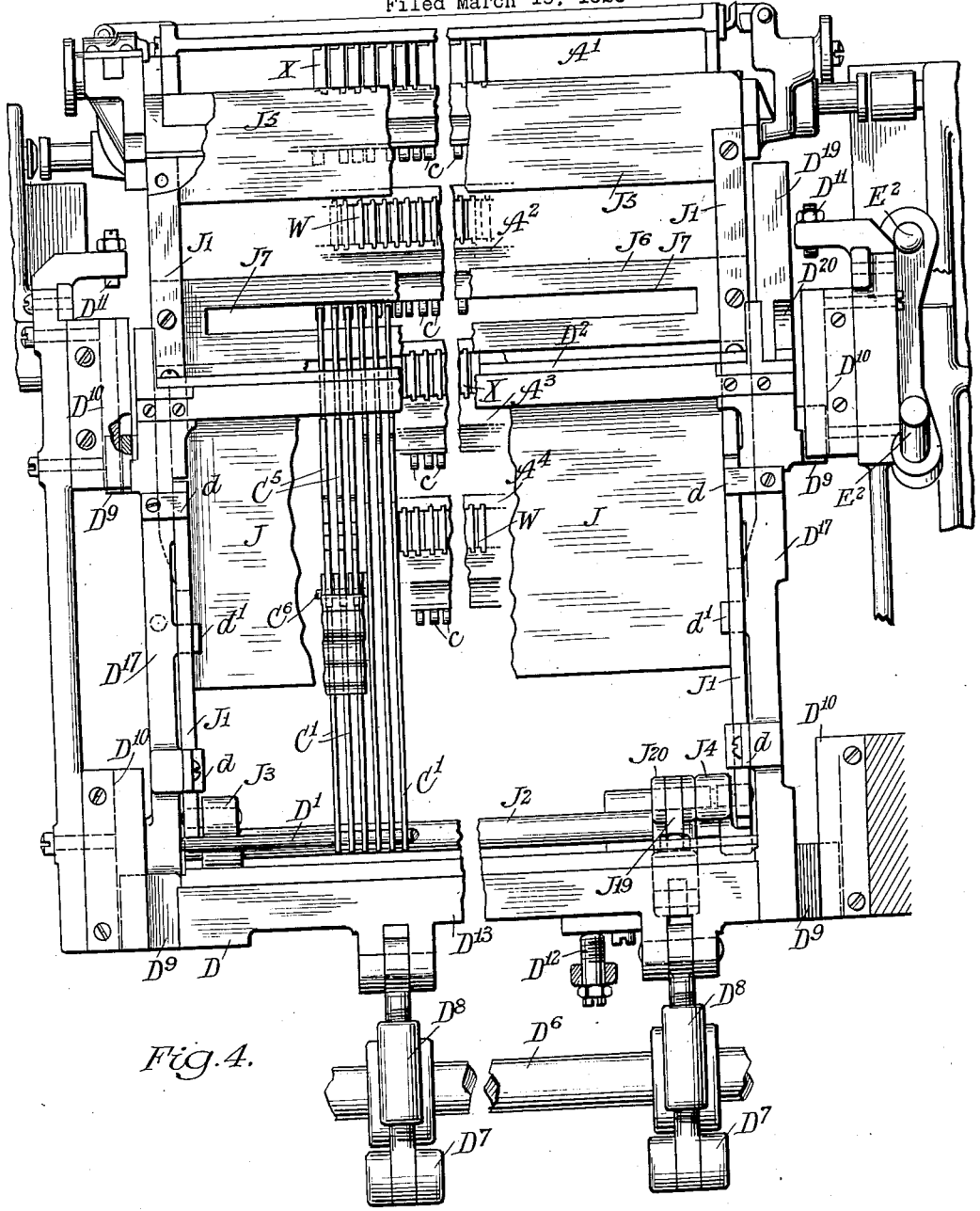
Fig. 4 is a front elevation of the supporting frame for the escapement actuating devices and associated parts.

While the required adjustments of the supporting frame D may be effected in different ways, in the present instance there is employed for the purpose a hand lever $D^3$ (Figs. 1 and 6) arranged at the front of the machine within convenient reach of the operator and connected by a link $D^4$ to an arm $D^5$ depending from a rock shaft $D^6$ which latter is journaled in the fixed machine frame and provided with additional arms $D^7$ pivotally connected by links $D^8$ to the lower end of the supporting frame D at opposite sides thereof. As best shown in Figs. 4 and 5, the said supporting frame is provided at its four corners with guide blocks $D^9$ slidably engaged in fixed guideways $D^{10}$ of the machine frame. A pair of set screws $D^{11}$ arranged above and in the path of the two upper guide blocks serve to arrest the frame in its upper adjusted position, while a single set screw $D^{12}$ arranged to engage the lower cross-bar $D^{13}$ thereof serves to arrest it in its lower adjusted position.

Figure 2:
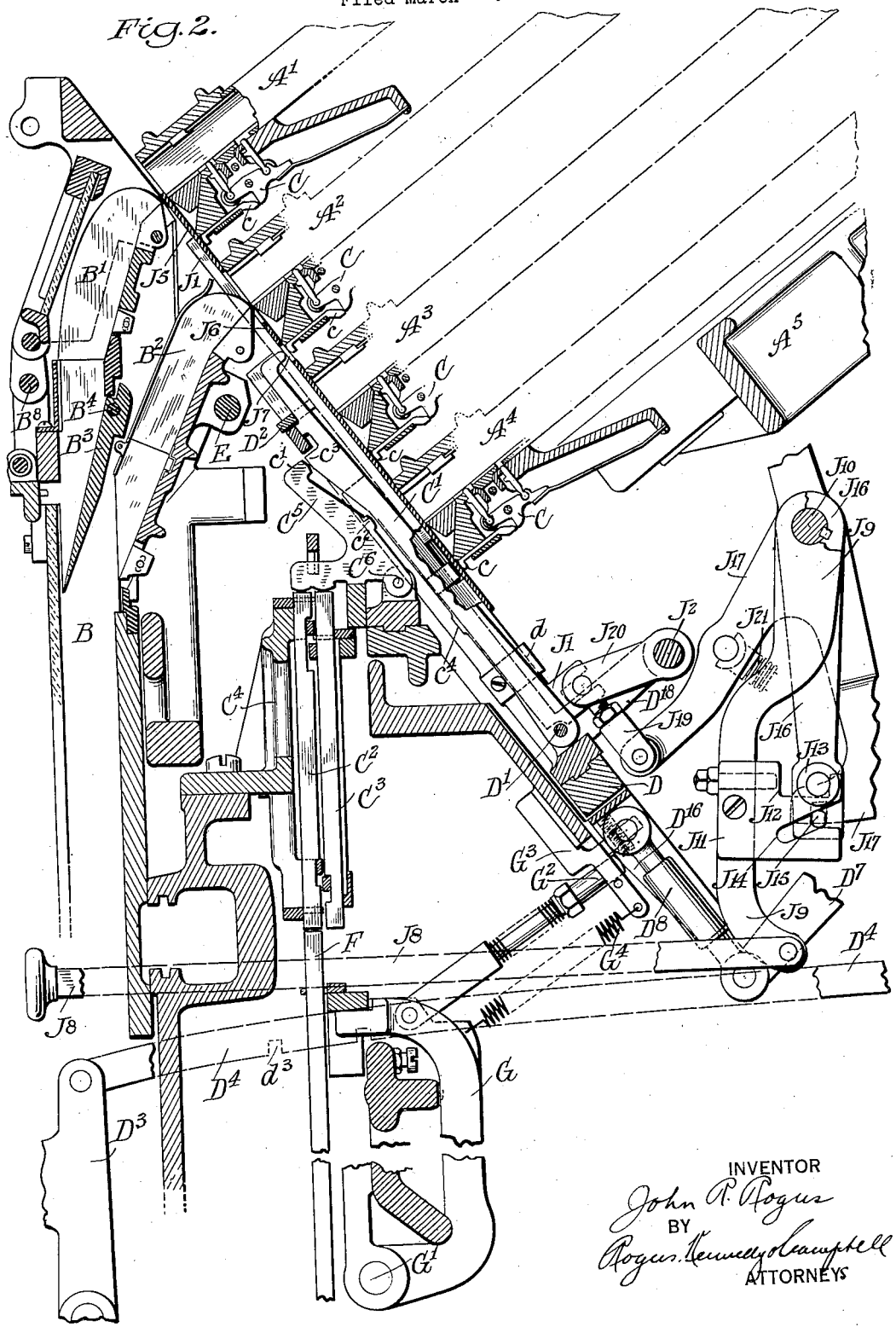
Fig. 2 is a vertical section through the assembling mechanism, showing the escapement actuating devices operatively connected to an inner magazine.
Figure 3:
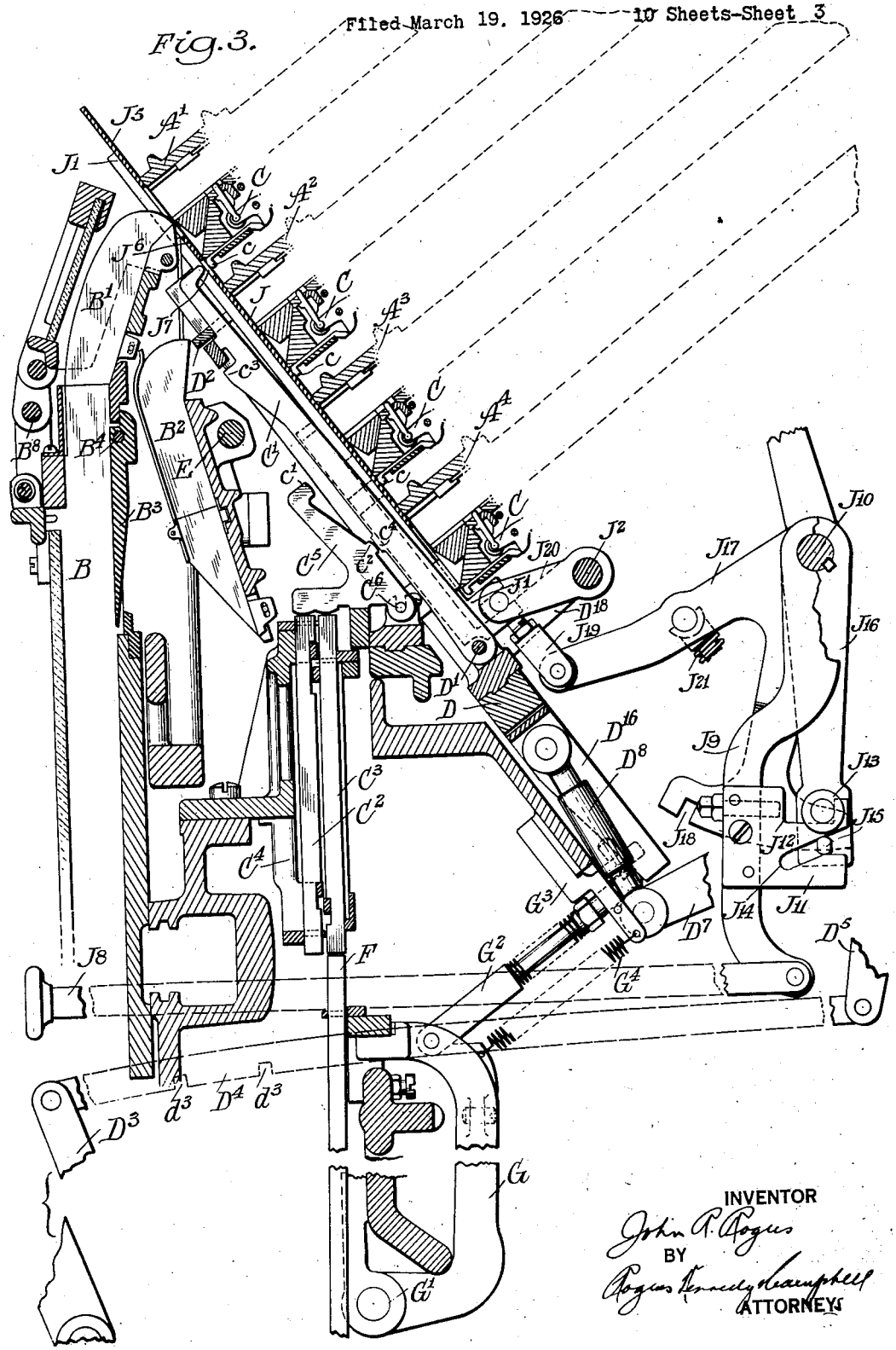
Fig. 3 is a view similar to Fig. 2, showing the escapement actuating devices operatively connected to an outer magazine.

To permit the frame D with its escapement actuating levers $C^1$ to be adjusted back and forth between the two magazines, the inner channeled throat $B^2$ is mounted in such manner that it may be moved to operative or inoperative position according to the position of the actuating levers. To this end, the throat is fixed to a transverse rock shaft E adapted by its rotation in one direction or the other to locate the throat either in its operative position, as shown in Fig. 2, or in its inoperative position, as shown in Fig. 3. In the latter position of the throat, it stands well out of the way of the escapement actuating levers and permits them to be shifted freely across the inner magazine. While the movement of the throat might be effected manually, it is proposed to carry it out automatically by the adjustment of the frame D. Accordingly, the rock shaft $D^6$ is provided (see Fig. 1) with a forwardly projecting arm $D^{14}$ having a grooved cam piece $D^{15}$ arranged in engagement with a roller on one end of a centrally pivoted lever $E^1$, the latter being pivotally connected to two push rods $E^2$ bearing against the opposite ends of a similar lever $E^3$ fast upon the rock shaft E. As will be noted, the shape of the cam groove is such that when the shaft $D^6$ is turned in a clockwise direction and the supporting frame D thus adjusted upwardly to locate the actuating levers C in engaging relation to the escapements of the outer magazine $A^1$, the rock shaft E is turned anti-clockwise to move the throat $B^2$ from its operative position out of the way of the escapement actuating levers, such movement taking place during the initial movement of the supporting frame; whereas, when the shaft $D^6$ is turned in the opposite or anti-clockwise direction and the supporting frame thus adjusted downwardly to locate the actuating levers in engaging relation to the escapements of the inner magazine $A^2$, the rock shaft E is turned in a clockwise direction to move the throat back to its operative position for cooperation with the inner magazine, such movement taking place during the final adjustment of the supporting frame so as to avoid interference with the actuating levers.

Figure 9:
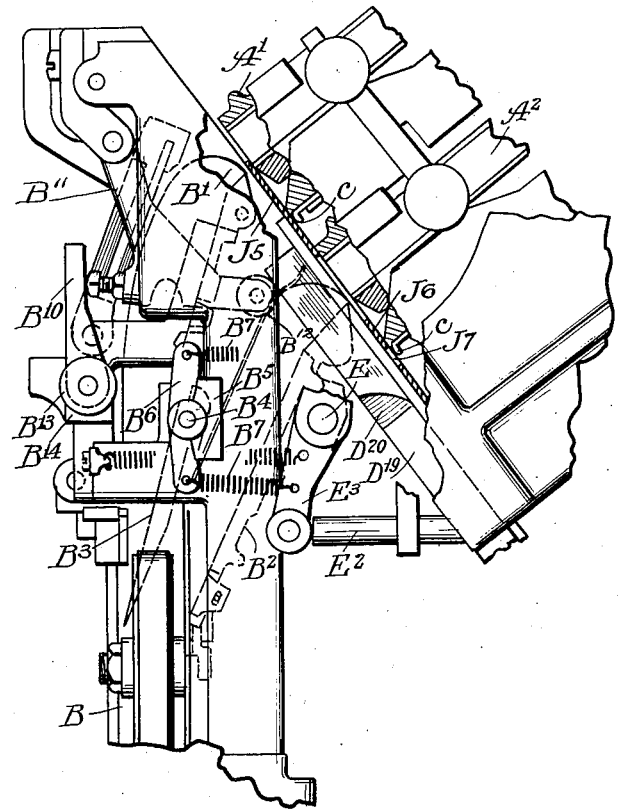
Fig. 9 is a side elevation of the upper portion of the raceway, showing the means employed for moving the upper assembler throat to permit operation of the detector.

In machines like the present, wherein two assembler throats open into a common raceway, the rear wall of the latter is usually provided with an adjustable plate section to open or close the passage between the inner throat and raceway. In this instance, the plate section B³ or cover plate (as it will hereinafter be termed) is mounted on a horizontal rock shaft B⁴, which (as best shown in Figs. 1 and 9) is journaled in the front side brackets B⁵ of the machine frame and provided with a lever B⁶ connected at its upper and lower ends by springs B⁷ to the pivoted lever E³. According to this arrangement, the actuation of the lever E³ through the connections just described, to swing the throat B² into and out of operative position, will also move the cover plate B³ back and forth within the raceway B to its open or closed position according to the position of the throat. It may be mentioned that the springs B⁷ are used in preference to links or other positive connections in order to prevent any damage that might occur in case the normal operation of the parts is interfered with, as from a clogged matrix or the like.

Since the spacing of the channels of the magazine A¹ is different from that of the magazine A², as before stated, the location of the escapements C and their actuating plungers c in the two cases will also be quite different, those of the magazine A¹ being offset from or located in different vertical planes from those of the magazine A² (see Fig. 4). To provide for these varying positions of the parts, the actuating plungers for the escapements of the magazine A¹ are formed (Fig. 14) at their forward ends with laterally extending or offset portions, so as to be properly engaged by selected levers of the series C¹, as in the prior Kennedy Patent No. 1,397,974. Furthermore, it will be noted (Fig. 14) that the corresponding matrices of the two fonts X and W (that is to say, those bearing the same character) are stored in differently located channels, due to the difference in number and spacing of such channels of the magazines, so that the finger keys of the keyboard cannot act through the same series of connections in effecting the release of like matrices of the different fonts. Means are, therefore, provided whereby different series of connections may be established through which the finger keys may act. Accordingly, the machine is equipped with two sets of vertically disposed key-controlled slides C² C³ mounted in a fixed frame C⁴ and arranged one set behind the other. The slides C² (91 in number) of the front set are substantially straight, lying in practically the same vertical planes as those which include the key rods F and the corresponding actuating levers C¹ and escapement plungers c of the regular magazine A² (see Fig. 6). On the other hand, the slides C³ (73 in number) of the rear set are offset in different directions and to different extents (Figs. 6 and 14) so that their lower end portions will align with the appropriate key rods F, while their upper end portions will align with certain selected levers C¹ and the escapement plungers c of the special magazine A¹ controlling the release of the corresponding matrices.

Both sets of slides C² C³ act upon the escapement levers C¹ through a single series of bell crank levers C⁵, pivoted at C⁶ in the machine frame. All of the escapement levers C¹ are actuated by the front set of slides C² in effecting the release of matrices W contained in the magazine A² when the frame D is in its lower adjusted position; whereas, only certain selected levers C¹ are actuated by the rear set of slides C³ in effecting the release of matrices X contained in the magazine A¹ when the frame D is in its upper adjusted position. In order that the bell crank levers C⁵ may cooperate properly with the escapement levers C¹ in their different adjusted positions, the former are each provided with two engaging projections $c^1$ $c^2$, the projections $c^1$ being located remote from the pivots C⁶ and adapted to engage corresponding projections $c^3$ on the escapement levers C¹ when they occupy their lower adjusted position (Figs. 2 and 7), and the projections $c^2$ being located closer to the pivots C⁶ and adapted to engage similar projections $c^4$ on the escapement levers C¹ when they occupy their upper adjusted position (Figs. 3 and 8). In this way, the change of leverage caused by adjusting the escapement levers C¹ relatively to the bell crank levers C⁵ is compensated for and the operative stroke of the escapement levers made uniform in both of their adjusted positions.

The slides C² C³ are operated from the keyboard (not shown) through the regular set of key rods F before referred to. Since the ordinary arrangement of the key rods permits a limited amount of movement at the top without disturbing their operative relation to the actuating cam yokes below, the upper ends of the rods are preferably mounted in an oscillatory frame G pivoted at G¹ to the machine frame and capable of adjustment back and forth to locate the rods in operative relation to the slides of one set or the other as desired. In the embodiment illustrated, it is proposed to operate the frame G automatically, and preferably by the adjustment of the escapement actuating levers C¹, so that the selection of the desired magazine will bring about the operative connection of the finger keys to the appropriate channels of that particular magazine. To this end (Figs. 2 and 3), the frame G is provided about midway of its length with a push rod G² (adapted to yield in case of undue resistance) extended rearwardly through a fixed supporting bracket G³ so as to engage a cam plate D¹⁶ depending from the lower cross-bar of the supporting frame D.

A pull string $G^4$ fastened at one end to the bracket $G^3$ and at its other end to the frame G acts to hold the rod $G^2$ constantly pressed against said cam plate. As thus arranged, the cam plate $D^{16}$ permits the spring $G^4$ to adjust the frame G to the rear when the supporting frame D is raised and acts through the rod $G^2$ to adjust the frame G to the front when the supporting frame is lowered, the form and arrangement of the parts being such that the key rods F will be located by the first adjustment in operative relation to the rear set of slides $C^3$ to establish one series of connections between the finger keys and the escapements of the special magazine $A^1$, and located by the second adjustment in operative relation to the front set of slides $C^2$ to establish a different series of connections between the finger keys and the escapements of the regular magazine $A^2$.

The keyboard connections for effecting the release of the display matrices X from the special magazine $A^1$ are clearly shown by the diagram of Fig. 14, wherein the letters at the top indicate the location of the matrices in the magazine, while the letters at the bottom indicate the finger key layout or the location of the particular rods F controlled by the finger keys. It is pointed out that there is a group of five channels located at the extreme right beyond the last key rod F and containing the matrices bearing the character Z and the hyphen, quotation, apostrophe and dollar marks. To provide for the actuation of the escapements for these offset channels, five more escapement actuating levers $C^1$ and bell crank levers $C^5$ are added to the series, said levers being actuated by slides $C^7$ comprising part of the rear set $C^3$ and extended below the latter so as to make connection with an equal number of rocking bails or their equivalents $C^8$. These bails may be of any approved form, such for example as those employed in the Kennedy Patent No. 1,397,974 before mentioned, and serve to connect the slides $C^7$ to the corresponding or appropriate key-rods F. It will also be noted that direct connections cannot be made for the characters em, fsp and th, on account of the intervening slides $C^3$. Consequently, devices $C^9$ similar to the bails $C^8$ and operating between short slide sections $C^3$ are used in controlling the release of these particular characters. In other respects, the connections between the key rods and the matrix channels are made through the offset slides $C^3$ as first described.

In machines equipped with shiftable magazines, it is customary to employ a feeler device movable, prior to the shifting of the magazines, across the delivery end of the magazine in use to detect the presence of a protruding matrix or matrices. A similar device J is also incorporated in the present machine and according to this invention is adjustable into operative relation to either of the magazines in operative position. In the embodiment illustrated (see Figs. 2, 3, 4 and 5), the detector J is carried by the adjustable supporting frame D, wherein it is slidably mounted for relative movement by means of retaining clips $d\ d'$, these clips being secured to the upright side bars $D^{17}$ of said frame and arranged to engage the vertical slide members $J^1$ of the detector. The lower ends of the slide members $J^1$ are formed with open notches operatively engaged with short arms $J^3\ J^4$ of a transverse rock shaft $J^2$, which shaft is journaled in bearing arms $D^{18}$ projecting rearwardly from the upright side bars $D^{17}$ of the supporting frame D, and is adapted by its rotation in opposite directions to slide the detector up and down relatively to the frame D. The detector itself comprises an upper plate portion $J^5$ adapted to move across the delivery end of the active magazine and a lower plate portion $J^6$ adapted to move between the escapement levers $C^1$ and plungers $c$ and of sufficient extent to cover the ends of the magazines below the one in use. The lower plate portion $J^6$ is formed with an elongated aperture or slot $J^7$ through which the upper ends of the escapement levers $C^1$ reciprocate in actuating the escapements C and in itself constitutes a second feeler device which serves to detect prior to the adjustment of the frame D whether or not the levers $C^1$ are in proper position. The rounded ends of the escapement levers permit them to be cammed back to their normal position by the detector plate $J^6$, if they are but slightly displaced.

Figure 10:
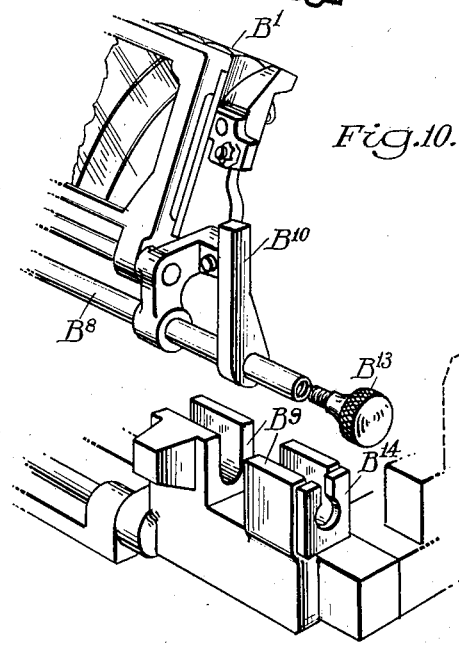
Fig. 10 is a detailed perspective view showing the manner of mounting the upper assembler throat to permit its ready removal.

In order that the detector plate $J^5$ may pass between the delivery end of the magazine $A^1$ and the upper throat $B^1$ when the detector as a whole is adjusted downwardly and upwardly into and out of operative relation to the inner magazine $A^2$, the throat is mounted so that it may be moved to and from operative position, such movement in the present instance being controlled by the adjustment of the frame D. In the present instance (see particularly Figs. 9 and 10), the throat $B^1$ is made fast to a supporting rod $B^8$ journalled at its ends in suitable bearings $B^9$ and having fixed thereto an upstanding finger $B^{10}$ arranged to engage a set screw projecting forwardly from a lever $B^{11}$ pivotally mounted in a side bracket of the machine frame. The lever $B^{11}$ is also provided at its free end with an anti-friction roller $B^{12}$, arranged to track upon the front face of an upward extension $D^{19}$ of the frame D (see also Figs. 4 and 5) and adapted to enter a recess $D^{20}$ formed therein. When the frame D is in its upper position, the roller $B^{12}$ stands within the recess $D^{20}$, the upper end of the throat B¹ being flush with the delivery end of the magazine A¹ and the detector plate J⁵ located in operative position thereabove (Fig. 3). In adjusting the frame D downwardly, the throat B¹ is rocked slightly forward away from the magazine A¹ as the roller B¹² is cammed out of the recess D²⁰ (Figs. 2 and 9) and will be maintained in such position until the recess, under the reverse adjustment of the frame D is again brought into registry with the roller. Preferably, the bearings B⁹ are open at the top, as shown in Fig. 10, so that the throat B¹ may be quickly and easily removed, if desired, and another of different form substituted therefor, as would be required if the outer magazine A¹ were of the regular ninety channel type. A knurled thumb-nut B¹³, screwed into one end of the fulcrum rod B⁸ and whose shank is adapted to fit into an aperture of a hardened plate B¹⁴ on the end of one of the bearing blocks B⁹, serves to maintain the throat in place and permits the latter to be swung forward to give access to the magazine A¹ or the interior parts.

Figure 11:
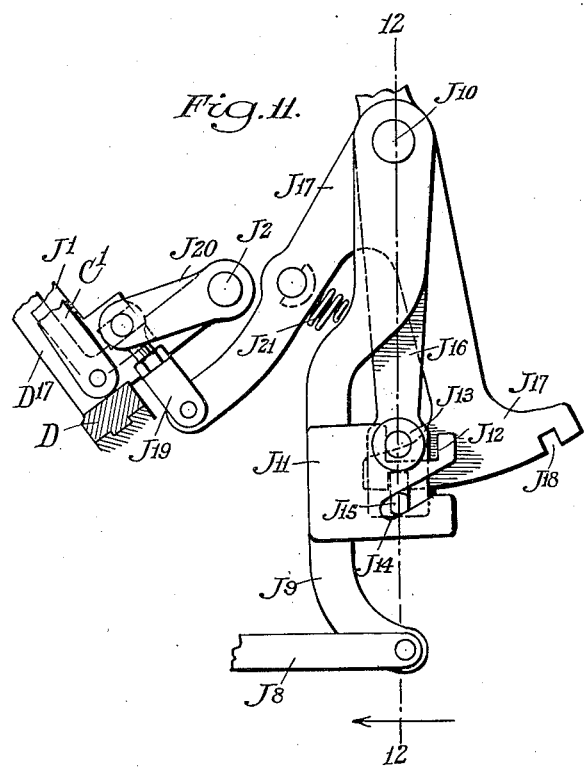
Fig. 11 is a detail of the detector operating parts.
Figure 12:
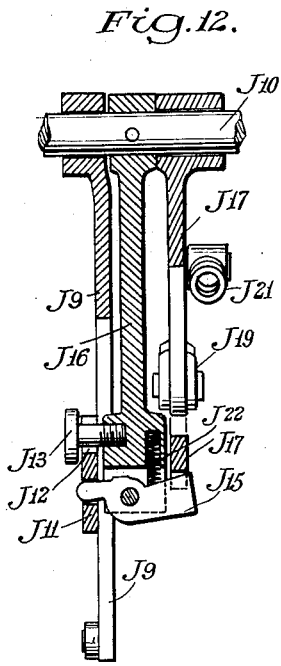
Fig. 12 is a vertical section taken on line 12—12 of Fig. 11.

The actuating means for the detector J are controlled by a hand push rod J⁸ located at the front of the machine within easy reach of the operator, it being understood that since both plates J⁵, J⁶ are secured to the side members J¹ they will be moved conjointly, one across the end of the active magazine and the other between the escapements and their actuating members. In the embodiment illustrated, such means comprise a curved lever arm J⁹ loosely mounted on a rock shaft J¹⁰ and connected to the rear end of the push rod J⁸, which (as shown in Fig. 1) may be held forwardly in its inactive position by a spring $j$ anchored to the machine frame. The lever arm J⁹ (see particularly Figs. 11 and 12) is provided with a plate J¹¹ formed in its upper edge with a recess J¹² to receive a pin J¹³ and formed in its rear edge with an inclined cam slot J¹⁴ to engage one end of a pivoted latch J¹⁵, both the pin J¹³ and the latch J¹⁵ being carried by an arm J¹⁶ fixed to and depending from the rock shaft J¹⁰. The opposite end of the latch J¹⁵ is arranged to engage in either one of two notches J¹⁸ formed in the arcuate edge of one arm of a bell crank lever J¹⁷, which is also loosely mounted on the rock shaft J¹⁰. The other arm of the lever J¹⁷ is connected by a link J¹⁹ to a short crank arm J²⁰ (Figs. 2, 3 and 4) fastened to the rock shaft J² before referred to adjacent the arm J⁴. This other arm of the lever J¹⁷ is also connected by means of a compression spring J²¹ to one of the operating arms D⁷ for the frame D, so that the same operative relation between the lever J¹⁷ and the detector device will be maintained in both adjusted positions of that frame. The spring J²¹ is constantly under tension and serves to hold the detector plates upwardly in their inactive position. Normally, the bell crank lever J¹⁷ is disconnected from the depending arm J¹⁶ and (being loosely mounted on the rock shaft J¹⁰) is free to be moved with the frame D through the connections just described, the latch J¹⁵ at such times being held clear of the notches J¹⁸ by a light coil spring J²² (Fig. 12). The spacing of these notches is such that one or the other will be disposed above the latch J¹⁵ according to the adjusted position of the frame D, see Figs. 2 and 3 by way of comparison. With this arrangement, therefore, the first or initial thrust of the push rod J⁸ swings the curved lever J⁹ rearwardly and by means of the cam slot J¹⁴ rocks the latch into engagement with the registering notch J¹⁸ in the bell crank lever J¹⁷. An operative connection is thus established between the push rod J⁸ and the rock shaft J¹⁰ and consequently between said rock shaft and the rock shaft J². As a result, when the rod is pressed further to the rear, the rock shaft J¹⁰ will be turned in an anti-clockwise direction and the detector J drawn downwardly against the tension of the spring J²¹ through the connections before described, the upper plate J⁵ passing across the delivery end of the magazine A¹ or the magazine A², as the case may be, and the lower plate J⁶ passing between the ends of the actuating levers C¹ and the escapement plungers c. Instead of relying solely upon the latch J¹⁵ to connect the push rod J⁸ with the depending arm J¹⁶ and the rock shaft J¹⁰, a more solid connection is afforded by the engagement of the front wall of the recess J¹² with the pin J¹³, before mentioned, such engagement taking place at the moment the latch enters the notch J¹⁸ in the lever J¹⁷, so that the turning of the shaft in the direction stated will be effected through said pin, rather than through the latch. When hand pressure against the push rod J⁸ is relieved, the spring J²¹, acting against the bell crank lever J¹⁷, raises the detector J back to its normal inactive position and restores the other parts to their original condition, the spring $j$ connected to the push rod J⁸ insuring the disengagement of the latch J¹⁵ from the bell crank J¹⁷ and bringing the rear wall of the recess J¹² into contact with the pin J¹³ of the depending arm J¹⁶, which latter is thus held under the tension of the spring $j$ in its normal position (indicated by dotted lines in Fig. 1) as determined by the engagement of a stop pin J²³ thereon with a fixed part of the machine frame. It will now be seen that the detector J may be adjusted with the frame D from one magazine to another as desired and actuated at will in either adjusted position independently of the frame to detect the presence of protruding matrices or of improperly located escapement levers, as intended, and thereby avoid damage to the parts. The well-known magazine registering unit $A^7$ (shown and described fully in the Kennedy Patent No. 1,396,125), which serves to support and lock the magazines in operative position, is also brought under control of the push rod $J^8$, so that the unlocking of the magazines and the actuation of the detector plates will be effected by one and the same operation. Such control is established in the present instance (see dotted lines, Fig. 1) by an arm $A^8$ fast to the rock shaft $J^{10}$ and having its upper end engaging a notch in the lower gauge bar $A^9$. Hence, if either of the detector plates $J^5$ $J^6$ be arrested in the course of its normal operation, the turning of the shaft $J^{10}$ and the unlocking and shifting of the magazines will be prevented.

Figure 13:
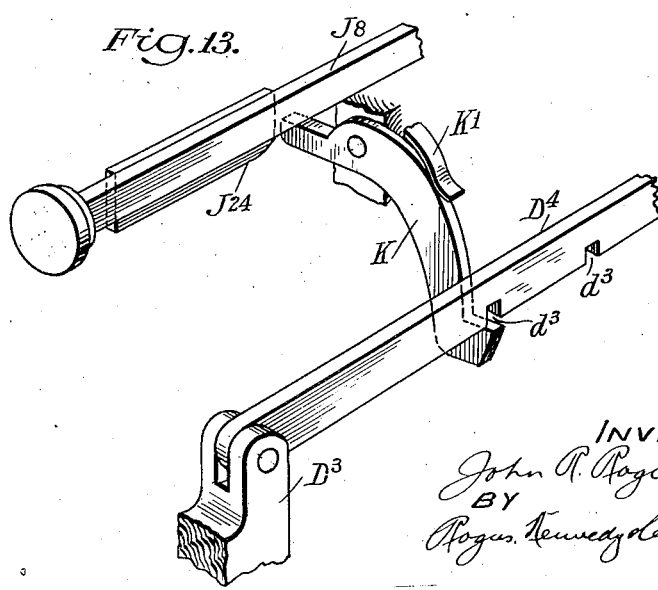
Fig. 13 is a detailed perspective of a safety device.

A safety device, arranged between the push rod $J^8$ and the link $D^4$, is also provided to prevent the operation of the hand lever $D^3$ when the rod is pushed in. As clearly shown in Fig. 13, this device is in the form of a latch K pivoted to the machine frame and held normally out of action by a flat spring $K^1$, one end of the latch being disposed adjacent the under edge of the push rod $J^8$ in the path of a cam plate $J^{24}$ fastened thereto, and its other end being located beneath the link $D^4$. The latter is formed with two notches $d^3$, one or the other of which is adapted to register with the latch K, according to the adjusted position of the hand lever $D^3$, the arrangement being such that under ordinary conditions the rod $J^8$ may be pushed back unimpeded to actuate the detector J and through the cam plate $J^{24}$ rock the latch K into engagement with the link $D^4$. Operation of the hand lever $D^3$ and the adjustment of the frame D is thus prevented until the push rod is restored to its normal forward position, thereby obviating possible damage of the parts which might result from an attempt to adjust the frame D while the detector J is connected to the push rod. Moreover, if the frame D be improperly adjusted, the notches in the bell crank lever $J^{17}$ would fail to register with the latch $J^{15}$ and a rearward thrust of the rod $J^8$ might break off that end of the latch engaged with the cam slot $J^{14}$. This danger is also obviated by the safety device K, since at such times the notches $d^3$ in the link $D^4$ would also be out of vertical alignment with the latch K and the latter, being unable to yield, will serve as a stop to prevent operation of the push rod.

The means herein provided for distributing the matrices of the seventy-two character font X and the ninety character font W into the magazines $A^1$ and $A^2$ will now be described. Heretofore, in machines capable of handling complete sets of ordinary and display matrices, the distributing mechanism has been made adjustable in order to properly handle the matrices of one or the other (but not both) of said sets as desired. In the present instance, however, the distributing mechanism is adapted to distribute the matrices of both sets simultaneously into the appropriate channels of their respective magazines without regard to their channel location, it being remembered that the matrices of the two sets occupy differently located channels according to character. Such mechanism, in the embodiment illustrated, comprises an upper primary distributor M (Fig. 1), whereby the matrices are first separated according to font, and a pair of lower secondary distributors, which receive the matrices after font separation and release them according to character into their appropriate magazine channels. The lower distributors (Fig. 15) consist of two longitudinally ribbed or permuted bars $X^5$ $W^5$ and the usual set of five matrix conveying screws Z. The bar $W^5$ is of regular form to adapt it to cooperate with the matrix fonts W, being provided with ninety-one combinations equally spaced apart to correspond to the spacing of the matrix channels in the magazine $A^2$, whereas the distributor bar $X^5$, while of the same length as the bar $W^5$, is of special form to adapt it to cooperate with the martix fonts X, being provided with seventy-three combinations, unequally spaced apart to correspond to the spacing of the matrix channels in the magazine $A^1$. Accordingly, matrices from both the ordinary font W and display font X may be distributed simultaneously into the appropriate channels of the respective magazines and the machine thus rendered capable of handling the two fonts either separately or collectively as desired.

Two magazine entrances $X^1$ and $W^1$ are arranged to conduct the matrices as they are released by the lower distributors to their respective magazines $A^1$ $A^2$, the spacings of the channels of the entrances differing in accordance with the different spacings of the magazine channels. As shown in Fig. 15, these entrances are carried in a supporting frame Y pivoted at $Y^1$ on opposite sides of the distributor bracket so as to be movable, as ordinarily required, to and from their operative position for access to the receiving ends of the magazines. It will be noted, however, that the entrance $X^1$ is mounted in an auxiliary frame $X^2$, which is pivoted by means of flattened trunnions $X^3$ in open bearings formed in the upper ends of the supporting frame Y. This arrangement permits the entrance when lifted to the dotted line position indicated in Fig. 15 to be freely removed as an independent unit (see Fig. 16). The entrance $X^1$, when in place, is held against lateral displacement by a headed pin Y¹, protruding from the side of the frame Y and normally engaging a notch in the frame X², and is held in proper spaced relation to the companion entrance W¹ by an adjustable stop screw X⁴ banking against a flat seat on the frame Y.

As a further feature of this invention, attention is called to the fact that the two lower secondary distributors (see Figs. 1 and 15) are provided with matrix feelers X⁶ and W⁶ adapted to detect the presence of matrices undergoing distribution. These matrix feelers, which extend the full length of the distributor bars X⁵ and W⁵ normally stand clear of the matrices but are arranged to be moved across the matrix path by the operation of the push rod J⁸ before referred to. As shown in Fig. 15, the two feelers are carried by a common support O pivoted at O¹ on an axis located above the distributor bars, said support being provided with an operating arm O² adapted to be actuated from the magazine locking bar A⁷ through a system of levers O³ and O⁴ illustrated in full in Fig. 1. Without further description, it will be seen that when the rod J⁸ is pushed rearwardly to actuate the detector J at the front in either of its adjusted positions, the bar A⁷ is drawn forwardly to unlock the magazines, and this forward motion of the bar A⁷ is transmitted through the levers O⁴ and O³ to the operating arm O², which swings the support O rearwardly to project the feelers into the matrix path. If at the time any matrices are still engaged with either of the distributor bars, the rearward movement of the push rod J⁸ and hence the unlocking of the magazines will be prevented, so that the shifting of the magazines cannot take place until both of the distributors are cleared of matrices. In this way, delivery of the matrices to the wrong magazines is effectively guarded against.

It will have been understood from the foregoing description that by the mechanical selection of either the magazine A¹ or the magazine A² the finger keys of the keyboard will be operatively connected to the appropriate channels of the selected magazine and, moreover, that the matrices of both fonts may be assembled or mixed in the same line and distributed simultaneously to their respective magazines. The machine, therefore, may be classed as an improved magazine machine capable of handling any of the ordinary fonts W or any of the larger display fonts X, or both together.

As previously stated, the invention has been shown only in preferred form and by way of example and as applied to the particular kind of machine described, but obviously many modifications and alterations therein and in its mode of adaptation will suggest themselves to those skilled in the art and still be comprised within its scope. It will also be noted that while the various features described are closely related and mutually cooperate to bring about the desired results, many of them might be used alone or in connection with other features to good advantage.

Having thus described my invention, what I claim is:

1. In a typographical composing machine, the combination of inner and outer matrix magazines each having a series of escapements, a channeled raceway to receive the matrices therefrom, a channeled throat through which the matrices pass from the inner magazine to the raceway, a set of actuating members mounted independently of the channeled throat and adjustable across the inner magazine into operative relation to the escapements of the outer magazine, and a mounting for the channeled throat permitting it to be moved out of the way of the escapement actuating members.

2. In a typographical composing machine, the combination of inner and outer matrix magazines each having a series of escapements, a channeled raceway to receive the matrices therefrom, a channeled throat through which the matrices pass from the inner magazine to the raceway, a set of actuating members mounted independently of the channeled throat and adjustable into operative relation to the escapements of the outer or inner magazine as desired, and a mounting for the channeled throat permitting it to be moved to operative or inoperative position according to the position of the escapement actuating members.

3. In a typographical composing machine, the combination of inner and outer matrix magazines each having a series of escapements, a channeled raceway to receive the matrices therefrom, a channeled throat through which the matrices pass from the inner magazine to the raceway, an adjustable cover-plate to open or close the passage between the throat and raceway, a set of actuating members adjustable into operative relation to the escapements of the outer or inner magazine as desired, a mounting for the channeled throat permitting it to be moved to operative or inoperative position according to the position of the escapement actuating members, and means whereby the cover-plate is adjusted to open or closed position according to the position of the channeled throat.

4. In a typographical composing machine, the combination of inner and outer matrix magazines each having a series of escapements a channeled raceway to receive the matrices therefrom, a pivotally mounted channeled throat through which the matrices pass from the inner magazine to the raceway, a pivoted cover-plate to open or close the passage between the throat and raceway, and a set of actuating members adjustable into operative relation to the escapements of the outer or inner magazine as desired.

5. In a typographical composing machine, the combination of inner and outer matrix magazines each having a series of escapements, a channeled raceway to receive the matrices therefrom, a movable channeled throat through which the matrices pass from the inner magazine to the raceway, a set of actuating members mounted independently of the channeled throat, adjustable into operative relation to the escapements of the outer or inner magazine as desired, and means for moving the channeled throat to operative or inoperative position according to the position of the escapement actuating members.

6. In a typographical composing machine, the combination of inner and outer matrix magazines each having a series of escapements, a channeled raceway to receive the matrices therefrom, a movable channeled throat through which the matrices pass from the inner magazine to the raceway, a set of actuating members mounted independently of the channeled throat, means for adjusting the actuating members into operative relation to the escapements of the outer or inner magazine as desired, and means controlled by the adjustment of the actuating members for moving the channeled throat to operative or inoperative position according to the position of the escapement actuating members.

7. In a typographical composing machine, the combination of inner and outer matrix magazines each having a series of escapements, a channeled raceway to receive the matrices therefrom, a movable channeled throat through which the matrices pass from the inner magazine to the raceway, a set of actuating members mounted independently of the channeled throat, means for adjusting the actuating members into operative relation to the escapements of the outer or inner magazine as desired, and means actuated during the initial adjustment of the escapement actuating members from the inner to the outer magazine for moving the channeled throat to inoperative position and actuated during the final adjustment of said members from the outer to the inner magazine for moving the throat to operative position.

8. In a typographical composing machine, the combination of inner and outer matrix magazines each having a series of escapements, a channeled raceway to receive the matrices therefrom, a movable channeled throat through which the matrices pass from the inner magazine to the raceway, a set of actuating members mounted independently of the channeled throat, a supporting frame carrying the actuating members and adjustable to locate them in operative relation to the escapements of the outer or inner magazine as desired, and means actuated by the adjustment of the supporting frame for moving the channeled throat to operative or inoperative position as required.

9. In a typographical composing machine, the combination of inner and outer matrix magazines each having a series of escapements, a channeled raceway to receive the matrices therefrom, a channel throat through which the matrices pass from the inner magazine to the raceway and mounted to turn about an axis intermediate its ends, a set of actuating members, a supporting frame carrying the actuating members and adjustable to locate them in operative relation to the escapements of the outer or inner magazine as desired, and means actuated by the adjustment of the supporting frame for rocking the channeled throat to an operative or inoperative position as required, the said means including a pair of arms connected to the channeled throat and extending in opposite directions therefrom, push rods cooperating with the extremities of said arms, a centrally pivoted lever connected at its opposite ends to said push rods, and a cam carried by the adjustable supporting frame and cooperating with the centrally pivoted lever.

10. In a typographical composing machine, the combination of two or more magazines, and a matrix detector adjustable into operative relation to a selected magazine and movable transversely across the end of said magazine to detect the presence of protruding matrices.

11. In a typographical composing machine, the combination of two or more magazines, a matrix detector, means for adjusting the detector into operative relation to a selected magazine, and independent means for moving the detector transversely across the end of the selected magazine.

12. In a typographical composing machine, the combination of a matrix magazine provided with a series of escapements, a set of actuating members arranged in operative relation to the escapements, and a detector plate movable across the space between the escapements and their actuating members.

13. In a typographical composing machine, the combination of a matrix magazine provided with a series of escapements, a set of actuating members for the escapements, said magazine and escapement actuating members being adjustable one relatively to the other to locate the actuating memers into or out of operative relation to the escapements, and a detector plate movable across the space between the escapements and their actuating members preparatory to the relative movement of the magazine and actuating members.

14. In a typographical composing machine, the combination of a matrix magazine provided with a series of escapements, a series of actuating members arranged in operative relation to the escapements, and a pair of detector plates movable conjointly, one transversely across the end of the magazine and the other across the space between the escapements and their actuating members.

15. In a typographical composing machine, the combination of two or more matrix magazines each having a series of escapements, a set of actuating members adjustable into operative relation to the escapements of one or another of the magazines, and a matrix detector movable transversely across the lower end of the active magazine operable prior to the adjustment of the actuating members for detecting the presence of a matrix protruding from said magazine.

16. In a typographical composing machine, the combination of a matrix magazine provided with a series of escapements, a set of actuating members for the escapements, said magazine and escapement actuating members being adjustable one relatively to the other to locate the actuating members into or out of operative relation to the escapements, and means for preventing said adjustment when one of the actuating members is in improper position.

17. In a typographical composing machine, the combination of two or more matrix magazines each having a series of escapements, a set of actuating members adjustable into operative relation to the escapements of one or another of the magazines, and means operable prior to the adjustment of the actuating members for detecting whether any of them is in improper position.

18. In a typographical composing machine, the combination of two or more matrix magazines each having a series of escapements, a set of actuating members for the escapements, an adjustable supporting frame carrying the escapement actuating members, a detector plate also carried by the supporting frame, means for adjusting the supporting frame to locate the actuating members and detector plate in operative relation to one or another of the magazines, and means for operating the detector plate preparatory to the adjustment of the supporting frame.

19. In a typographical composing machine, the combination of two or more matrix magazines each having a series of escapements, a set of actuating members for the escapements, an adjustable supporting frame carrying the escapement actuating members, a detector plate also carried by the supporting frame, means for adjusting the supporting frame to locate the actuating members and detector plate in operative relation to one or another of the magazines, means for operating the detector plate preparatory to the adjustment of the supporting frame, and connections to prevent the adjustment of the supporting frame when the matrix detector is in operated condition.

20. In a typographical composing machine, the combination of inner and outer matrix magazines, a channeled raceway having channeled throats to receive the matrices from the respective magazines, a detector plate adjustable into operative relation to one or another of the magazines, and means for moving the channeled throats out of the way of the detector plate during its adjustment.

21. In a typographical composing machine, the combination of a matrix magazine, a channeled raceway having a channeled throat to receive the matrices from the magazine, a pivot rod on which the channeled throat is mounted, open bearings to receive the rod, and releasable means for confining the rod in its bearings.

22. In a typographical composing machine, the combination of inner and outer matrix magazines each having a series of escapements, a set of pivoted actuating levers adjustable into operative relation to the escapements of one or another of the magazines, two sets of key-controlled slides for operating the actuating levers in their different operative positions, and intermediate devices for imparting a substantially uniform throw to the actuating levers when operated by the different sets of slides.

23. In a typographical composing machine, the combination of inner and outer matrix magazines each having a series of escapements, a set of pivoted actuating levers adjustable into operative relation to the escapements of one or another of the magazines, two sets of key-controlled slides for operating the actuating levers in their different operative positions, and intermediate levers formed and arranged to impart a substantially uniform throw to the actuating levers when operated by the different sets of slides.

24. In a typographical composing machine, the combination of two magazines, one containing a set of matrices occupying certain channels according to character and the other containing matrices occupying differently located channels according to character, means for selecting either magazine for use, a set of key-controlled devices, and means controlled by the selection of the desired magazine for operatively connecting the key-controlled devices to the appropriate channels of that magazine.

25. In a typographical composing machine, the combination of two magazines, one containing a set of matrices occupying certain channels according to character and the other containing matrices occupying differently located channels according to character, means for selecting either magazine for use, a set of key-controlled devices, different series of connections through which said devices act in effecting the release of like matrices from the different magazines, and means controlled by the selection of the desired magazine for rendering the appropriate series of connections active.

26. In a typographical composing machine, the combination of two magazines provided with escapements, one magazine containing a set of matrices occupying certain channels according to character and the other containing a set of matrices having a materially less number of characters and occupying different located channels according to character, means for selecting either magazine for use, a set of key-controlled devices equal in number to that of the characters in the first set of matrices, and automatic means for connecting the key-controlled devices in whole or in part to the escapements of the selected magazine according to the set of matrices contained therein.

27. In a typographical composing machine, the combination of two magazines, one containing a set of matrices occupying certain channels according to character and the other containing matrices occupying differently located channels according to character, means for selecting either magazine for use, a single set of escapement actuating members, a corresponding set of key-controlled devices for operating the actuating members, two sets of intermediate elements for transmitting motion from the key-controlled devices to the actuating members, and means for selecting one or the other set of intermediate elements to the exclusion of the other.

28. In a typographical composing machine, the combination of a single set of escapement actuating levers, a corresponding set of key-controlled rods for operating the actuating levers, two sets of intermediate slides for transmitting motion from the key-controlled rods to the actuating levers, and means for selecting one or the other set of slides to the exclusion of the other.

29. In a typographical composing machine, the combination of a single set of escapement actuating levers, a corresponding set of key-controlled rods for operating the actuating levers, two sets of intermediate slides for transmitting motion from the key-controlled rods to the actuating levers, the slides of one set being straight and those of the other offset for the purpose described, and means for selecting one or the other set of slides to the exclusion of the other.

30. In a typographical composing machine, the combination of two matrix magazines provided with escapements and containing matrices occupying differently located channels according to character, means for selecting either magazine for use, a single set of actuating members for the escapements of the selected magazine, a corresponding set of key-controlled devices for operating the actuating members, two sets of intermediate elements for transmitting motion from the key-controlled devices to the actuating members, and means controlled by the selection of the desired magazine for bringing into action the appropriate set of intermediate elements.

31. In a typographical composing machine, the combination of two matrix magazines provided with escapements and containing matrices occupying differently located channels according to character, means for selecting either magazine for use, a single set of actuating levers for the escapements of the selected magazine, a corresponding set of key-controlled rods for operating the actuating levers, two sets of intermediate slides for transmitting motion from the key-controlled rods to the actuating levers, the slides of one set being straight and those of the other offset to correspond to the different location of the matrices in the magazines, and means controlled by the selection of the desired magazine for bringing into action the appropriate set of intermediate slides.

32. In a typographical composing machine, the combination of two matrix magazines provided with escapements and containing matrices occupying differently located channels according to character, a single set of actuating members adjustable into operative relation to the escapements of one or the other of the magazines, a corresponding set of key-controlled devices for operating the actuating members, two sets of intermediate elements for transmitting motion from the key-controlled devices to the actuating members, and means controlled by the adjustment of the actuating members for bringing into action the appropriate set of intermediate elements.

33. In a typographical composing machine, the combination of a set of escapement actuating levers, an adjustable supporting frame carrying said levers, a corresponding set of key-controlled rods, two intermediate sets of slides for transmitting motion from the rods to the actuating levers, and means controlled by the adjustment of the supporting frame for bringing into action one or the other set of intermediate slides.

34. In a typographical composing machine, the combination of inner and outer matrix magazines provided with escapements, a channeled raceway to receive the matrices from the magazines, a movable channeled throat to conduct the matrices from the inner magazine to the raceway, a set of actuating levers, an adjustable supporting frame carrying said levers, a corresponding set of key-controlled rods for operating the actuating levers, two intermediate sets of slides for transmitting motion from the key-controlled rods to the actuating levers, and means controlled by the adjustment of the supporting frame for moving the channeled throat to active or inactive position and for bringing one or the other set of intermediate slides into action according to the position of the supporting frame.

35. In a typographical composing and distributing machine, the combination of two channeled magazines, one containing a set of matrices occupying certain channels according to character and the other containing a set of matrices occupying differently located channels according to character, means for distributing the matrices simultaneously into the two magazines irrespective of their channel location, and means for composing matrices from either magazine as desired.

36. In a typographical composing and distributing machine, the combination of two channeled magazines, one containing a set of matrices occupying certain channels according to character and the other containing a set of matrices occupying differently located channels according to character, distributing mechanism including two distributor bars, one for each magazine, differing as to form to correspond to their respective magazines, a common assembler entrance having two channeled throats also differing as to form to cooperate with the respective magazines, and key-controlled devices for releasing matrices from either magazine as desired.

37. In a typographical composing and distributing machine, the combination of two channeled magazines, one containing a set of matrices occupying certain channels according to character and the other containing a set of matrices occupying differently located channels according to character, distributing mechanism including two distributor bars, one for each magazine, differing as to form to cooperate with the respective magazines, two magazine entrances for conducting the matrices from the distributors to the respective magazines and likewise differing as to form to correspond, an assembler entrance having two channeled throats differing as to form to cooperate with said magazines, a set of key-controlled devices, and means for connecting said devices to the appropriate matrix channels of either magazine as desired.

38. In a typographical composing and distributing machine, the combination of two channeled magazines, one containing a set of matrices occupying certain channels according to character and the other containing a set of matrices occupying differently located channels according to character, distributing mechanism including two distributor bars, one for each magazine, differing as to form to correspond to their respective magazines, two magazine entrances for conducting the matrices from the distributors to the respective magazines and likewise differing as to form to correspond, an assembler entrance having two channeled throats differing as to form to cooperate with said magazines, a set of key-controlled devices, different series of connections through which said devices act in effecting the release of like matrices from the different magazines, and means for rendering one or the other series of connections active as desired.

39. In a typographical composing and distributing machine, the combination of two channeled magazines, one containing a set of matrices occupying certain channels according to character and the other containing a set of matrices occupying differently located channels according to character, distributing mechanism including two distributor bars, one for each magazine, differing as to form to correspond to their respective magazines, two magazine entrances for conducting the matrices from the distributors to the respective magazines and likewise differing as to form to correspond, an assembler entrance having two channeled throats differing as to form to cooperate with said magazines, a set of escapement actuating members movable into operative relation to either selected magazine, a corresponding set of key-controlled devices, two intermediate sets of elements for transmitting motion from the key-controlled devices to the escapement actuating members, said elements differing in number and arrangement in the different sets to correspond to the different location of the matrices in the two magazines, and means for bringing either set of intermediate elements into action according to the magazine selected.

40. In a typographical composing and distributing machine, the combination of two channeled magazines of the same size and each provided with escapements, one magazine containing a set of matrices occupying certain channels according to character and the other magazine containing a set of matrices comprising fewer characters and occupying differently located channels according to character, distributing mechanism including two distributor bars of the same length, one for each magazine and differing in the number and spacing of their combinations to correspond to the respective magazines, an assembler entrance having two channeled throats differing in the number and arrangement of their channels to correspond to the respective magazines, a set of key-controlled devices, and means for operatively connecting said devices to the appropriate escapements of either selected magazine.

In testimony whereof, I have affixed my signature hereto.

JOHN R. ROGERS.